(12) United States Patent
Engelhorn et al.

(10) Patent No.: US 12,462,308 B2
(45) Date of Patent: *Nov. 4, 2025

(54) SYSTEMS AND METHODS FOR ANALYZING PROPERTY RELATED INFORMATION

(71) Applicant: State Farm Mutual Automobile Insurance Company, Bloomington, IL (US)

(72) Inventors: Amy Engelhorn, Normal, IL (US); Timothy Joel Davis, Chicago, IL (US); Joanna Salata, Tempe, AZ (US); Dijon Schroff, Bloomington, IL (US); Justin Devore, Atlanta, IL (US); Sarah Kirby, Normal, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,137

(22) Filed: Jan. 22, 2024

(65) Prior Publication Data

US 2024/0161200 A1 May 16, 2024

Related U.S. Application Data

(63) Continuation of application No. 18/176,280, filed on Feb. 28, 2023, now Pat. No. 11,915,323, which is a
(Continued)

(51) Int. Cl.
*G06Q 40/08* (2012.01)
*G06Q 30/0601* (2023.01)
(Continued)

(52) U.S. Cl.
CPC ......... *G06Q 40/08* (2013.01); *G06Q 30/0623* (2013.01); *G06T 19/006* (2013.01); *G06Q 50/16* (2013.01); *G06T 2219/004* (2013.01)

(58) Field of Classification Search
CPC ...................................... G06Q 40/00
(Continued)

(56) References Cited

U.S. PATENT DOCUMENTS 6,324,516 B1 * 11/2001 Shults .................... G06Q 10/10
705/2
6,535,855 B1 * 3/2003 Cahill .................... G06Q 20/00
705/346

(Continued)

*Primary Examiner* — Kirsten S Apple
(74) *Attorney, Agent, or Firm* — Armstrong Teasdale LLP

(57) ABSTRACT

A property analyzer device may include (1) a receiver configured to receive property identification information from a mobile device, the received property identification information including a picture of the property and/or a property location; (2) a retriever configured to retrieve property-related information from multiple property sources (such as public record databases, websites, or an internal company database) based upon the received property identification information; (3) a processor configured to consolidate the retrieved property-related information into a consolidated property-related image of the property; and (4) a transmitter configured to transmit the consolidated property-related image to the mobile device for review by a user. The mobile device may display the consolidated images that may include several images of the property taken over time (such as showing repairs or improvements made), home insurance quotes, home loan quotes, and other types of property-related or community information that home buyers or owners would find useful.

24 Claims, 9 Drawing Sheets

Related U.S. Application Data continuation of application No. 17/573,372, filed on Jan. 11, 2022, now Pat. No. 11,631,141, which is a continuation of application No. 16/419,189, filed on May 22, 2019, now Pat. No. 11,238,537, which is a continuation of application No. 15/243,000, filed on Aug. 22, 2016, now Pat. No. 10,346,924.

(60) Provisional application No. 62/240,958, filed on Oct. 13, 2015.

(51) Int. Cl.
*G06T 19/00* (2011.01)
*G06Q 50/16* (2024.01)

(58) Field of Classification Search
USPC .................................................. 705/36 R
See application file for complete search history.

(56) References Cited

U.S. PATENT DOCUMENTS

| | | | |
|---|---|---|---|
| 6,826,536 B1* | 11/2004 | Forman | G06Q 10/10 705/3 |
| 6,871,140 B1 | 3/2005 | Florance et al. | |
| 6,934,692 B1* | 8/2005 | Duncan | G06Q 30/06 705/26.25 |
| 7,076,452 B2 | 7/2006 | Florance et al. | |
| 7,254,559 B2 | 8/2007 | Florance et al. | |
| 7,289,965 B1 | 10/2007 | Bradley et al. | |
| 7,340,401 B1* | 3/2008 | Koenig | G06Q 40/08 600/300 |
| 7,356,516 B2* | 4/2008 | Richey | G06Q 30/0253 705/16 |
| 7,395,219 B2* | 7/2008 | Strech | G06Q 40/00 705/4 |
| 7,467,094 B2* | 12/2008 | Rosenfeld | G06Q 30/04 340/539.18 |
| 7,487,114 B2 | 2/2009 | Florance et al. | |
| 7,657,441 B2* | 2/2010 | Richey | G06Q 20/403 705/30 |
| 7,733,351 B1 | 6/2010 | Sinnard et al. | |
| 7,835,919 B1 | 11/2010 | Bradley et al. | |
| 7,966,203 B1 | 6/2011 | Pietrzak | |
| 7,974,854 B1 | 7/2011 | Bradley et al. | |
| 8,010,377 B1 | 8/2011 | Bradley et al. | |
| 8,010,906 B1 | 8/2011 | Sinnard et al. | |
| 8,027,850 B1 | 9/2011 | Pietrzak | |
| 8,140,418 B1* | 3/2012 | Casey | G06Q 40/02 709/227 |
| 8,311,941 B2* | 11/2012 | Grant | H04L 67/5651 705/40 |
| 8,650,048 B1 | 2/2014 | Hopkins, III et al. | |
| 8,655,595 B1 | 2/2014 | Green et al. | |
| 8,682,682 B1 | 3/2014 | Bradley et al. | |
| 8,760,285 B2 | 6/2014 | Billman et al. | |
| 9,009,610 B2 | 4/2015 | Florance et al. | |
| 9,213,994 B2 | 12/2015 | Green et al. | |
| D764,461 S* | 8/2016 | Romanoff | D14/453 |
| 9,892,463 B1* | 2/2018 | Hakimi-Boushehri | G06Q 10/10 |
| 9,928,553 B1* | 3/2018 | Harvey | G06Q 40/08 |
| 9,996,882 B1 | 6/2018 | Manzella et al. | |
| 10,102,589 B1 | 10/2018 | Tofte et al. | |
| 10,198,771 B1 | 2/2019 | Madigan et al. | |
| 10,223,751 B1 | 3/2019 | Hutchinson et al. | |
| 10,296,978 B1 | 5/2019 | Corder et al. | |
| 10,346,924 B1 | 7/2019 | Engelhorn et al. | |
| 10,387,966 B1 | 8/2019 | Shah et al. | |
| 10,453,149 B1 | 10/2019 | Gaudin et al. | |
| 10,510,120 B1 | 12/2019 | Roll | |
| 10,572,947 B1 | 2/2020 | Berends et al. | |
| 10,664,922 B1 | 5/2020 | Madigan et al. | |
| 10,699,346 B1 | 6/2020 | Corder et al. | |
| 10,930,141 B2 | 2/2021 | De Paz Alberola et al. | |
| 10,943,306 B1 | 3/2021 | Gaudin et al. | |
| 10,949,928 B1 | 3/2021 | Roll | |
| 11,003,334 B1 | 5/2021 | Conway et al. | |
| 11,049,189 B2 | 6/2021 | Shah et al. | |
| 11,100,594 B1 | 8/2021 | West et al. | |
| 11,151,654 B2 | 10/2021 | Trainor et al. | |
| 11,232,873 B1 | 1/2022 | Aspro et al. | |
| 11,308,247 B2 | 4/2022 | McDade | |
| 11,556,995 B1 | 1/2023 | Little et al. | |
| 11,715,074 B2 | 8/2023 | Aspro et al. | |
| 11,783,423 B1 | 10/2023 | Yager et al. | |
| 11,941,712 B2 | 3/2024 | Trundle | |
| 2003/0233292 A1* | 12/2003 | Richey | G06Q 40/12 705/28 |
| 2004/0153382 A1* | 8/2004 | Boccuzzi | H04M 15/73 705/34 |
| 2005/0288957 A1 | 12/2005 | Eraker et al. | |
| 2005/0288958 A1 | 12/2005 | Eraker et al. | |
| 2006/0271456 A1* | 11/2006 | Romain | G06Q 40/00 705/67 |
| 2007/0088507 A1 | 4/2007 | Haberlen et al. | |
| 2007/0260401 A1 | 11/2007 | Sydor et al. | |
| 2008/0059351 A1* | 3/2008 | Richey | G06Q 20/20 705/35 |
| 2009/0177500 A1 | 7/2009 | Swahn | |
| 2009/0265193 A1* | 10/2009 | Collins | G06Q 30/0185 901/46 |
| 2010/0002777 A1 | 1/2010 | Boyle et al. | |
| 2010/0027777 A1* | 2/2010 | Gupta | H04M 3/42195 379/210.01 |
| 2011/0047086 A1 | 2/2011 | Heisterkamp et al. | |
| 2011/0173122 A1* | 7/2011 | Singhal | G06Q 20/42 705/44 |
| 2011/0213628 A1* | 9/2011 | Peak | G06Q 40/08 705/4 |
| 2011/0218827 A1* | 9/2011 | Kenefick | G06Q 40/08 705/4 |
| 2011/0238564 A1* | 9/2011 | Lim | G06Q 40/02 705/38 |
| 2011/0276489 A1* | 11/2011 | Larkin | G06Q 20/20 705/44 |
| 2012/0046973 A1* | 2/2012 | Eshleman | G06Q 99/00 705/500 |
| 2012/0047072 A1* | 2/2012 | Larkin | G06Q 20/02 705/44 |
| 2012/0066005 A1* | 3/2012 | Stewart | G06Q 30/0282 705/4 |
| 2012/0116820 A1* | 5/2012 | English | G06Q 40/08 705/4 |
| 2012/0275651 A1* | 11/2012 | Brown | G06F 16/51 382/103 |
| 2012/0330690 A1* | 12/2012 | Goslinga | G06Q 40/00 705/4 |
| 2013/0073321 A1* | 3/2013 | Hofmann | G06Q 10/10 705/4 |
| 2013/0166325 A1* | 6/2013 | Ganapathy | G06Q 40/08 705/4 |
| 2013/0197807 A1 | 8/2013 | Du et al. | |
| 2013/0275263 A1 | 10/2013 | Carlin, Jr. et al. | |
| 2013/0304514 A1* | 11/2013 | Hyde | G06Q 40/08 705/4 |
| 2014/0058854 A1* | 2/2014 | Ranganath | G06Q 20/405 705/16 |
| 2014/0136242 A1 | 5/2014 | Weekes et al. | |
| 2014/0257871 A1* | 9/2014 | Christensen | H04W 4/40 705/4 |
| 2014/0310162 A1* | 10/2014 | Collins | G06F 3/04842 707/769 |
| 2014/0358592 A1 | 12/2014 | Wedig et al. | |
| 2015/0019262 A1 | 1/2015 | Du et al. | |
| 2015/0032480 A1* | 1/2015 | Blackhurst | G06Q 40/08 705/4 |
| 2015/0187019 A1* | 7/2015 | Fernandes | G06Q 40/08 705/4 |
| 2015/0302529 A1 | 10/2015 | Jagannathan | |
| 2016/0048934 A1 | 2/2016 | Gross | |

(56) References Cited

U.S. PATENT DOCUMENTS

| | | |
|---|---|---|
| 2016/0055595 A1 | 2/2016 | Green et al. |
| 2021/0090188 A1 | 3/2021 | Lai et al. |
| 2021/0090300 A1 | 3/2021 | Leppänen et al. |
| 2022/0012999 A1 | 1/2022 | Marotta et al. |
| 2022/0013222 A1 | 1/2022 | Marotta et al. |
| 2022/0405856 A1 | 12/2022 | Hedges et al. |
| 2023/0023808 A1 | 1/2023 | Wall et al. |
| 2023/0153916 A1 | 5/2023 | Little et al. |
| 2023/0342732 A1 | 10/2023 | Aspro et al. |
| 2023/0342857 A1 | 10/2023 | Gibson et al. |
| 2023/0342858 A1 | 10/2023 | Gibson et al. |
| 2023/0342859 A1 | 10/2023 | Gibson et al. |
| 2023/0342862 A1 | 10/2023 | Gibson et al. |
| 2023/0342867 A1 | 10/2023 | Gibson et al. |
| 2023/0342868 A1 | 10/2023 | Gibson et al. |
| 2023/0342869 A1 | 10/2023 | Gibson et al. |
| 2023/0377070 A1 | 11/2023 | Gibson et al. |
| 2024/0037680 A1 | 2/2024 | Gibson et al. |
| 2024/0046366 A1 | 2/2024 | Yager et al. |
| 2024/0087290 A1 | 3/2024 | Hedges et al. |

\* cited by examiner

SYSTEMS AND METHODS FOR ANALYZING PROPERTY RELATED INFORMATION

CROSS-REFERENCE TO RELATED APPLICATION

This application is a continuation of and claims priority to U.S. patent application Ser. No. 18/176,280, filed Feb. 28, 2023, which is a continuation of and claims priority to U.S. patent application Ser. No. 17/573,372, filed Jan. 11, 2022, which issued as U.S. Pat. No. 11,631,141 on Apr. 18, 2023, which is a continuation of and claims priority to U.S. patent application Ser. No. 16/419,189, filed May 22, 2019, which issued as U.S. Pat. No. 11,238,537 on Feb. 1, 2022, which is a continuation of and claims priority to U.S. patent application Ser. No. 15/243,000, filed Aug. 22, 2016, which issued as U.S. Pat. No. 10,346,924 on Jul. 9, 2019, which claims priority to U.S. Provisional Patent Application Ser. No. 62/240,958, filed Oct. 13, 2015, the contents of which are hereby incorporated by reference, in their entirety and for all purposes, herein.

FIELD OF THE DISCLOSURE

The present disclosure relates to a computing device-based application that may analyze and consolidate property data, and more particularly, to systems and methods for consolidating property-related data from multiple data sources into a consolidated view that may be output to the display of a user interface of a user device to improve user convenience and efficiency.

BACKGROUND

Computing device-based applications are becoming increasingly popular in today's world of ever expanding mobile devices and mobile device functionality. One of the reasons for the increasing popularity is the ability of users to download mobile applications to their mobile devices. For example, a mobile application may be a software application developed for use on a small wireless computing device, such as a smartphone, a tablet, a personal digital assistant, an MP3 player, and the like. Mobile applications may be designed with consideration for demands and constraints of the devices, and also take advantage of any specialized capabilities that a mobile device may have.

In the current housing and commercial property markets, disparate information sources related to a property exist. For example, some resources for gathering property information about a property a user is interested in purchasing include records history aggregators such as HOUSEFAX®, public records, in-person visual inspections of the property, aerial imagery, multiple listing service (MLS) listings, and the like. However, the drawbacks here are the need to use all these different reports and imagery in order to gather the information about the property. Also, when a user applies for a home loan, for homeowner's insurance, for closing on the property, and the like, the information must be submitted or re-submitted each time.

Accordingly, there is a need for instant and consolidated access to useful information that may be used to facilitate customer, realtor, and insurance agent research of a property. In addition, the act of purchasing a home also typically includes a process of shopping for a home loan (i.e., mortgage rate) and homeowners insurance. But currently these are treated as separate processes rather than being integrated into a continuum, and typically require separate application processes and re-submission of the same user information. The present embodiments may alleviate the drawbacks and disadvantages described above and/or other deficiencies of the conventional techniques.

BRIEF SUMMARY

The present embodiments may relate to systems and methods for analyzing and electronically linking and/or combining relevant home purchasing data sources into a consolidated view on a user-interface (UI) for a user, thereby enabling advanced and timely research capabilities. For example, based upon location services such as a Global Positioning System (GPS) and/or object recognition, such as photo matching of property photos, a target location address may be established. The address may be used to retrieve home buying-relevant information from internal company data stores and from third parties. In addition, images captured by a camera, for example, a camera of a mobile device may be used to discover disparities with pictures of the property previously stored on internal or third party databases, such as when a remodeling of or damage to the property has occurred, as well as recognition of potential safety, liability, and maintenance concerns. Trends related to the property and/or to the neighborhood may also be displayed, for example, trends in market price over a particular amount of time, insurance rates, school information, and the like.

In one aspect, a property analyzer computing device may be provided. The property analyzer computing device may be configured to display a combination of property-related information on a screen of a mobile device. The property analyzer computing device may include (1) a receiver configured to receive property identification information from a mobile device of a user, the received property identification information comprising a property identifier including at least one of a picture of the property and a location of the property; (2) a retriever configured to retrieve property-related information from multiple property sources based upon the received property identification information, each of the property sources comprising a public record database or an internal database of a company; (3) a processor configured to consolidate the retrieved property-related information into a consolidated property-related image; and/or (4) a transmitter configured to transmit the consolidated property-related image to the mobile device of the user to facilitate display of the consolidated property-related image on the screen of the mobile device. The property analyzer computing device may include additional, less, or alternate functionality, including those discussed elsewhere herein.

In another aspect, a computer-implemented method for displaying a combination of property-related information on a screen of a mobile device may be provided. The method may include (1) receiving property identification information from a mobile device of a user, the received property identification information comprising a property identifier including at least one of a picture of the property and a location of the property; (2) retrieving property-related information from multiple property sources based upon the received property identification information, each of the property sources comprising a public record database or an internal database of a company; (3) consolidating the retrieved property-related information into a consolidated property-related image; and/or (4) transmitting the consolidated property-related image to the mobile device of the user to facilitate display of the consolidated property-related image on the screen of the mobile device for user review.

The method may include additional, less, or alternate actions, including those discussed elsewhere herein.

In yet another aspect, at least one non-transitory computer-readable storage media having computer-executable instructions embodied thereon for displaying a combination of property-related information on a screen of a mobile device may be provided. The computer-executable instructions, when executed by at least one processor, may cause the processor to (1) receive property identification information from a mobile device of a user, the received property identification information comprising a property identifier including at least one of a picture of the property and a location of the property; (2) retrieve property-related information from multiple property sources based upon the received property identification information, each of the property sources comprising a public record database or an internal database of a company; (3) consolidate the retrieved property-related information into a consolidated property-related image; and/or (4) transmit the consolidated property-related image to the mobile device of the user to facilitate display of the consolidated property-related image on the screen of the mobile device for user review. Additional, less, or alternate instructions may be provided such as instructions directing the functionality discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature only and not as restrictive.

BRIEF DESCRIPTION OF THE DRAWINGS

The Figures described below depict various aspects of the systems and methods disclosed therein. It should be understood that each Figure depicts an exemplary embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present exemplary embodiments are not limited to the precise arrangements and are instrumentalities shown, wherein.

Figure 1:
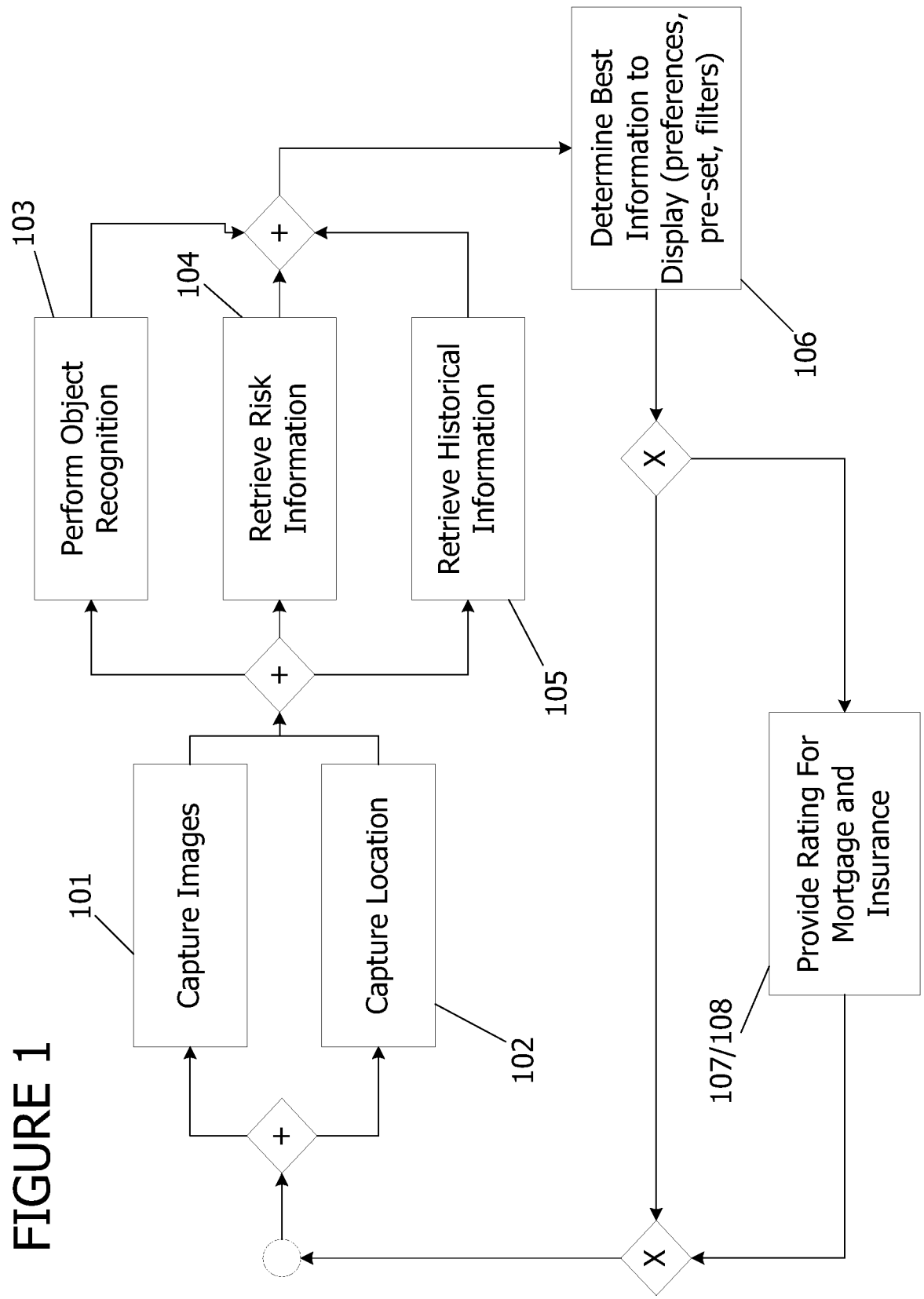
FIG. 1 illustrates an exemplary block flow chart of data being captured by a computer-implemented application of a mobile device and a computer system determining property-related information to be displayed in a consolidated view based upon the captured data, according to one exemplary embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for consolidating relevant home-buying data on a screen of a user device for user convenience, enabling more efficient, advanced, and useful research capabilities. For example, based upon location services such as GPS and/or object recognition, such as photo matching of property photos, a target location address of the property may be established. The address may then be used to retrieve home purchasing information from third parties (e.g., realtors, surveyors, building inspectors, insurance companies, county assessors, and the like), and from public databases, such as those stored on the internet. The home purchasing information gathered from third parties, public databases, and the like, which have not been previously combined in the conventional art, may be coupled together by aspects of the exemplary embodiments. The combined information may be output to a user of a mobile device, or other computing device, to allow the user to view home purchasing information coupled together on a single screen, thus creating a more convenient and efficient way for a user to shop for a property.

Previously, a significant amount of home purchasing information would need to be received separately and/or independently of each other, and displayed separately and independently. In some examples of the home purchasing information, the user would not even be able to retrieve certain home purchasing information electronically on a mobile device, or at all, but instead must gather the information in-person such as pictures of the property, previous pictures of the property, remodeling data, and the like, or not receive or gather the information at all, such as how the property actually looked 5 years ago, insurance information, workers compensation information, licensing information, and the like. In contrast, according to exemplary embodiments, home purchasing information that was not made available to users, or information that a mobile device did not have an option to download and/or receive, may be gathered or retrieved by the systems and methods herein, and transmitted to the mobile device. Furthermore, the previously unavailable or unreceivable home purchasing information is now capable of being combined on the same screen with other home purchasing relevant information.

For example, the property analyzer computer device of the present exemplary embodiments may be controlled by an entity such as an insurance company, a realtor, a lender, and the like. As will be appreciated, these companies, and many others, have access to data that individual people or users do not have access to. Accordingly, the entity may gather or otherwise collect data that is not available to an individual user, aggregate and/or anonymize the data to prevent individual personal information from being leaked, and provide such aggregated or anonymized data to a user. As another example, the entity could ask or receive permission or affirmative consent from their customers to make data available to the public which is not normally made available. Accordingly, the property analyzer computing device may electronically link the previously unavailable data with a property or address, and output such electronically linked data to a user.

According to various exemplary embodiments, image data captured by a camera, for example, a camera of a mobile device for displaying a consolidated image of property-related information, may be used to discover disparities with third party data, public data, and currently captured data, such as when a remodeling of the property has occurred. Furthermore, the image data may be used to recognize potential safety, liability, and maintenance concerns. Trends related to the property and/or to the neighborhood in which the property is located may also be displayed, for example, trends in price over a particular amount of time, trends in utility costs, trends in the weather, and the like.

A determination of the information to be displayed may be based upon one or more business rules, for example, when a major concern or risk of the target property is identified, or based upon user preferences, user settings, and the like. Users may act on the displayed information in a plurality of ways. For example, a user may receive a customized homeowner's insurance quote that may be based upon information captured, retrieved, and/or known about the property or surrounding properties, receive customized mortgage rates, discover flood insurance eligibility, browse historical images of the property, and the like.

In addition to the object recognition inputs, the computer-implemented data application or mobile application may retrieve and aggregate data from the internal company data for the property, for example, data stored by realtors, insurance companies, banks, service providers, and the like. As a non-limiting example, the data may include historical severe weather data for the area or vicinity, crime records for the area, legislative activities that bear on the property (for example, local property tax rates), local municipal alerts (historical), tax credit records (for example, because of upgrades to the property's appliances), building permit data, county assessor valuations, claims/loss data, flood plain maps, peril maps (for example, wildfire or storm surge risks), historical "street view" images (for example, keyed by address and timestamp metadata), historical utilities rate data (for example, trends and current going rates for electricity, and the like), market value fluctuations (per sale and/or per estimated value ranges via services such as ZILLOW®), school district information (including which schools serve the neighborhood and their various rankings and performance data), upkeep trends (based upon evidence in historical images), information about the surrounding area (for example, grocery stores within walking distance, travel times to a user's workplace), and the like.

In some embodiments, augmented reality enhancements may also be made to the displayed consolidated property data by overlaying any and/or all of the above information onto a video feed or stream of the property while the property is being displayed by the mobile device. In addition, in some embodiments, the application may be used to stream information to a remote customer service associate (for example, an insurance sales agent, a realtor, a bank employee, and the like) in order to allow for visual images of the property to be further analyzed by a third party. As another example, in some embodiments, the application may be embedded within a larger suite of applications that facilitate the entire home purchasing experience, including, but not limited to, sales negotiation, inspections, closings, and the like.

The mobile device may be a smartphone, a tablet, a laptop, an MP3 player, or other computing device that enables a user of an application to experience a consolidated view of property-related information corresponding to a property. As a non-limiting example, the mobile application may be implemented by an insurance provider, or the like, such as an insurance carrier or a third party related to the insurance carrier associated with the property. The insurance provider may adjust an insurance policy (including premiums or discounts) covering or associated with the property based, at least in part, on data stored in the mobile application and/or data about surrounding properties in the area. In this example, a user may download the application, such as a mobile application, to a smartphone that the user owns and controls. Accordingly, the user may use the mobile application to provide property identification information to the insurance provider.

Furthermore, in some examples, the application or the mobile application may be used to combine various property buying or leasing processes. For example, a property purchasing/leasing process may be combined with a process for applying for homeowners insurance, applying for a loan from a bank, and the like. In this example, a user may only input their personal information once, into the mobile application, and the mobile application may retrieve and use this personal information for each process, thus reducing the amount of time a user must spend in order to perform various processes.

At least one of the technical problems addressed by this system may include: (i) disparate information sources related to a single property; (ii) separate process of a user buying a home and applying for a mortgage or home loan; (iii) separate process of user buying a home and applying for home owner's insurance; (iv) a user performing research to determine potential concerns associated with a property; (v) performing manual searches for property information on multiple real estate websites such as ZILLOW®, HOUSE-FAX®, and MLS®, and/or (vi) making a trip to public records and the county assessor's office to find out information about the property.

A technical effect of the systems and processes described herein may be achieved by performing at least one of the following steps: (a) receiving property identification information from a mobile device of a user, the received property identification information comprising a property identifier including at least one of a picture of the property and a location of the property; (b) retrieving property-related information from multiple property sources based upon the received property identifier, each of the property sources comprising a public record database or an internal database of a company; (c) consolidate the retrieved property-related information into a consolidated property-related image; and (d) transmitting the consolidated property-related image to the mobile device of the user.

The technical effect achieved by the system and methods may be at least one of: (i) integration of data sources (more numerous than in prior methods); (ii) picture-based risk location and property identification for a no-typing or data entering approach that still yields detailed information about a property; (iii) active object recognition for target and risk determination, not just report consolidation; (iv) historical image browsing and historical maintenance browsing; (v) pre-fill of an insurance quote or virtual application; and (vi) pre-fill of a mortgage or other loan quote or virtual application.

As an example, potential users of the systems and methods described herein include realtors, customers or clients, insurance agents, banks, surveyors, building inspectors, county assessors, and the like. As another example, potential uses of the systems and methods described herein include index/big data analysis, insurance claims, video quotes, mortgage or other loan rate quotes, insurance rate (or premium or discount) quotes, different property types including rental properties, and the like.

Exemplary Data Flow Diagram of the System

FIG. 1 illustrates an example of a block flow chart of data being captured by a computer-implemented application of a mobile device and a computer system determining property-related information to be displayed in a consolidated view based upon the captured data, according to one exemplary embodiment. In this example, the data may be captured by a mobile device of a user, for example, a mobile phone, a tablet, a laptop computer, a smart watch, and the like. The data may be transmitted to the back end computer system, such as, a property-related information consolidating computing device that is controlled by an insurance company, a realtor, a home owner, and the like.

Referring to FIG. 1, in 101, a user of a mobile device may capture one or more images of a property and transmit the one or more images to the computer system. As another example, in 102, the mobile device may transmit a location or location information of the property, for example, Global Positioning System (GPS) coordinates, and the like. As an example, the mobile device may include a mobile application that is being processed by a processor of the mobile device. In this case, the mobile application may automatically transmit the captured images and/or the location information to the computer system with or without user authentication. In the exemplary embodiments herein, the at least one of the captured image and the location information may be referred to as property identifiers, because the computer system may use this information to identify the specific property that the user is attempting to gather information about. That is, the property identifier may include at least one of the capture image of the property and the location information of the property.

Based upon at least one of the captured image and the location information, the computer system may retrieve historical information about the property, in 104, and risk information about the property, in 105. For example, the historical information and the risk information may be retrieved from one or more property sources, such as a public record database that is open to the public, or an internal database of a company visible to employees of the company, such as a company that is controlling the computer system, for example, an insurance company, a realtor, a lender, and the like.

Furthermore, when a captured image is transmitted to the computer system, the computer system may perform object recognition in 103 on the captured image by comparing the captured image to previously taken historical images of the property to identify any discrepancies, for example, as a result of damage, a remodel, and the like. In this example, a user does not need to enter specific address details about the property, but instead, may capture just an image and transmit the image to the computer system. Accordingly, the system facilitates the gathering of information about the property without a user of the mobile device having to enter information about the property other than merely capturing an image. The object recognition may go beyond historical and public record report information because it may be used to actually show physical changes to the house and what those changes look like over time, instead of mere descriptions of the changes. Accordingly, user convenience may be further enhanced by combining property-related information on a screen that would normally require the user to perform a separate look-up via a separate database.

Accordingly, object recognition information and/or GPS data may be used to retrieve historical data and pictures of the property. For example, a potential homebuyer may have the mobile application on their phone and when they go to look at a particular house, they may take a picture of it and submit it through the application. In this example, at least one of captured images and captured locations of the property will be transmitted. In response, the GPS location may be retrieved by the computing device, historical pictures of the house which may already be stored on the database may be matched and the computing device may determine yes, this is 123 Main Street, match that up, and then show historical views of what the house looked like (such as several images taken over several years), pictures that have already been saved in the system or that you have already been retrieved from a property-related source such as ZIL-LOW®, and the like. Accordingly, there is potential for homebuyers to see the changes that have happened to the house and the additional data may also be grabbed and presented to the potential buyer through the mobile application.

Because the data may be numerous, and the screen of a mobile device may be small in size, in 106 the computer system may determine some information from among all the total retrieved information that is best to be displayed to the user of the mobile device. For example, the computer system may determine the best information to be displayed based upon predefined rules set by the user, areas of concern detected by the computer system, filters, and the like. For example, a user/homebuyer may be interested in only one or a few categories of information, and not in every possible category of information about the property. For example, maybe the user is only concerned with tax information, flood information, and the like. The computer system may filter data to be displayed to the user based upon these preferences.

Furthermore, based upon at least one of the captured image, captured location, risk information, historical information, and object recognition information, at least one of mortgage rates and homeowner's insurance rates 107/108 may be displayed to the user of the mobile device. For example, insurance quotes (including premiums or discounts) may be given based upon user information, and data of the property that is received and/or retrieved. As another example, insurance quotes might not be based upon the individuals involved, but may instead be based upon, for example, an average insurance rate for the neighborhood by calculating square footage of the area around and their relative insurance rates, or just relative insurance rates based upon the assessed value of the property, and the like. In these examples, it is possible for a user of a mobile device to receive property information, insurance information, lending information, and the like, without having to input or type information into the mobile application. Instead, merely the location information and/or the picture of the property may be used to gather such information.

In some examples, the same data about the property may be used over again to provide different information. For example, the property identification information may be used to locate historical information about the property, and the same information may be used to rate and underwrite insurance and home loans for the property, thus easing user convenience. Also, because of the wealth of possible property-related information that may be received and/or retrieved, the computer system may determine the best information to use for an insurance estimate, a mortgage rate, and the like, that would be most relevant to display to the users.

The data flow in FIG. 1 may be a loop because the retrieved data and/or the mortgage and insurance rate information may be added to the captured image and/or captured location of the property, and a consolidated view including each category of data may be displayed on a screen of the mobile device. Furthermore, by providing mortgage rates and/or insurance rates in addition to home purchasing information to a user of the mobile device, the system facilitates continuity in the shopping experience by combining multiple home-purchasing tasks into a single application, and on a single screen, thus increasing user convenience. Also, this combined information may provide a user with a combined purchase total because it may include the mortgage, the insurance, and it may further include additional information, such as cost of utilities, examples of which will be further described below.

Exemplary Property Information Consolidation Device

Figure 2:
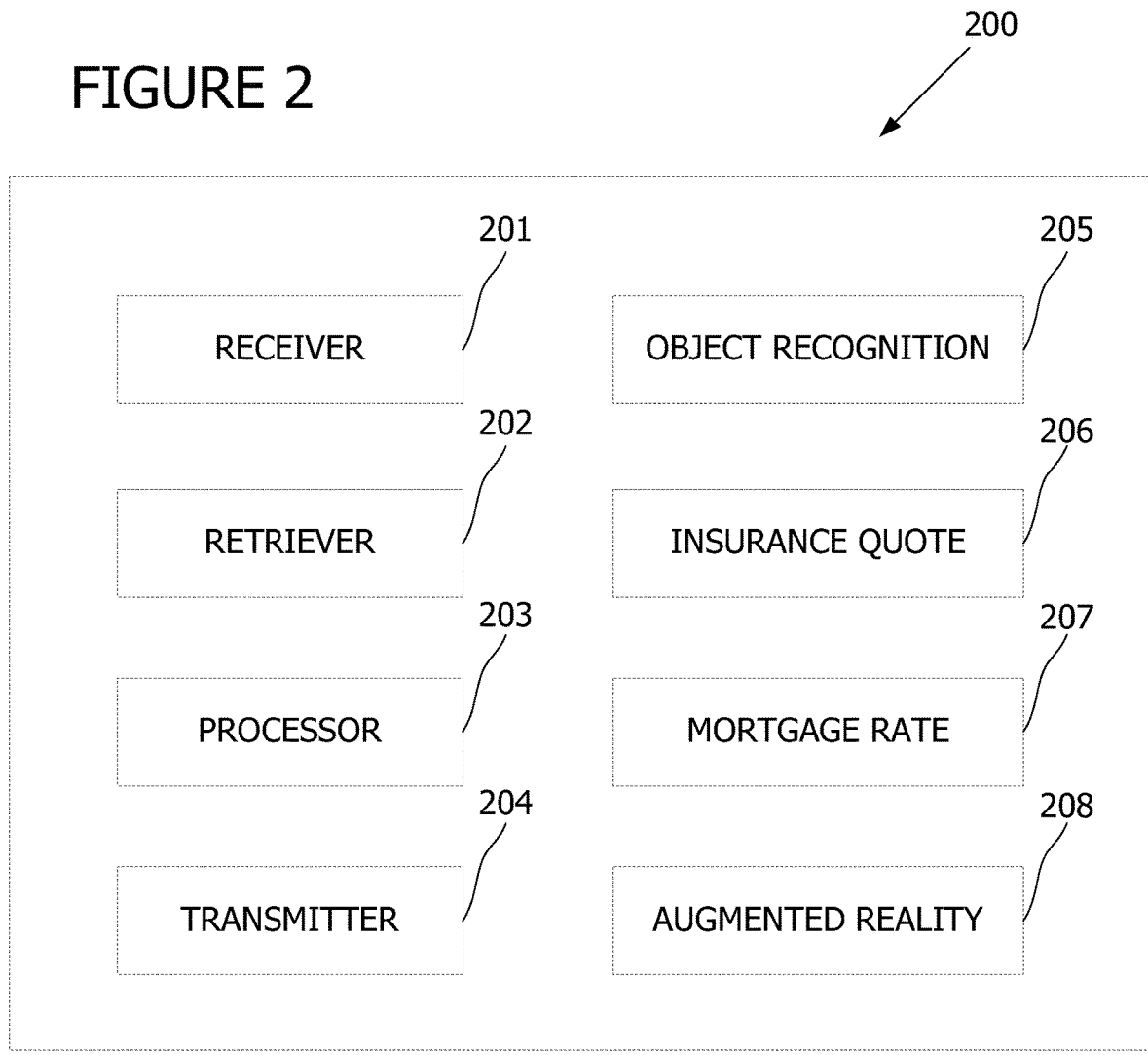
FIG. 2 illustrates an exemplary property analyzer computing device configured to provide a user with a consolidated view of property-related information, according to one exemplary embodiment.

FIG. 2 depicts an example of a property analyzing computing device configured to provide a user with a consolidated view of property-related information, according to one exemplary embodiment. Referring to FIG. 2, the property analyzer computing device 200 (computing device 200) may output a combination of property-related information to be displayed on a screen of a mobile device of the user. For example, the computing device 200 may include a receiver 201 that may receive property identification information from the mobile device of the user. In this example, the received property identification information may include a property identifier including at least one of a picture of the property and location information of the property. For example, the property identification information may be automatically received from a mobile application stored on the mobile device of the user. The identification information may include a location, such as GPS coordinates of the property, and the like.

The computing device 200 may also include a retriever 202 that may retrieve property-related information from multiple property sources based upon the received property identification information. In this example, each of the property sources may correspond to at least one of a public record database, an internal database of a company controlling the property analyzer computing device, an internal database of a third-party, and the like. Examples of property-related information will be further described later.

The computing device 200 may also include a processor 203 that may process retrieved information and consolidate the property-related information retrieved by the retriever, and generate a consolidated property-related image of the property including the consolidated property-related information. For example, the processor 203 may determine which retrieved proper-related information is the best information to show to a user of the mobile device based upon user preferences, settings, items of concern, and the like. The computing device 200 may also include a transmitter 204 that may transmit the consolidated property-related image to the mobile device of the user. Also, the consolidated property-related image may be subsequently updated or refreshed, and re-transmitted to the mobile device. For example, the consolidated image may be transmitted to a mobile application stored on the mobile device. In addition, in some examples, the transmitter 204 may transmit the consolidated property-related image to a customer service associate, for example, of an insurance company, a mortgage company, a realtor, and the like, for further processing and investigation.

The computing device 200 may further include an object recognition module 205. In response to receiving a picture of the property from the mobile device, the object recognition module may perform object recognition by comparing the received picture with historical pictures of the property to determine if any visual changes to the property have occurred. For example, if the property has been remodeled, damaged, and the like, there will be a discrepancy in the pictures. Accordingly, the object recognition module 205 may identify those changes in the consolidated image processed by the processor 203, and identify disparities in the public record data or the internal data of the property. Furthermore, when the computing device 200 determines that a change has occurred, the computing device may detect what caused such change, for example, from the property-related information retrieved by the retriever 202.

According to one or more exemplary embodiments, the computing device 200 may further include an insurance quote module 206 and/or a mortgage rate module 207. For example, the insurance quote module 206 may provide the user of the mobile device with a homeowner's insurance quote based upon at least one of a picture of the property, a location of the property, property insurance rates in the area, and the like. Also, the mortgage rate module 207 may provide the user of the mobile device with a mortgage rate on the total price of the property. When the processor 203 generates the consolidated image, the consolidated image may include the insurance quote and the mortgage rate.

Accordingly, the insurance quote module 206 and the mortgage rate module 207 may facilitate continuity in the home buying experience by enabling the user to not only search for information about the property, but also receive additional offers for insurance and mortgage rates providing a more fuller and efficient shopping experience.

The computing device 200 may further include an augmented reality module 208 that may be used to overlay property-related information retrieved by the retriever 202 onto a video feed displayed by the mobile device. For example, the augmented reality module may visually highlight changes that have been made to the property over time, and the like.

Examples of Property-Related Information that May be Retrieved and Consolidated by the Computing Device The retriever 202 of the property analyzer computing device may retrieve historical severe weather data for the property from a property source based upon the received property identification information, and the processor 203 may consolidate the retrieved historical severe weather data with the other property-related information retrieved by the retriever 202 to generate the consolidated processed image. As another example, the retriever 202 may retrieve risk information for the property from a property source based upon the received property location information, and the processor 203 may consolidate the risk information for the property with the other property-related information retrieved by the retriever 202 to generate the consolidated processed image. The risk information may include information about at least one of flooding, wildfire, and storm surge, with respect to the property.

The retriever 202 may retrieve criminal record data for the property from a property source based upon the received property identification information, and the processor 203 may consolidate the retrieved criminal record data with the other property-related information retrieved by the retriever 202 to generate the consolidated processed image. As another example, the retriever 202 may retrieve property tax data for the property from a property source based upon the received property identification information, and the processor 203 may consolidate the retrieved property tax data with the other property-related information retrieved by the retriever 202 to generate the consolidated processed image.

The retriever 202 may retrieve market value cost data for the property from a property source based upon the received property identification information, and the processor 203 may consolidate the retrieved market value cost data with the other property-related information retrieved by the retriever 202 to generate the consolidated processed image. As another example, the retriever 202 may retrieve building permit data for the property from a property source based upon the received property identification information, and the processor 203 may consolidate the retrieved building permit data with the other property-related information retrieved by the retriever 202 to generate the consolidated processed image.

The retriever 202 may retrieve school district information for the property from a property source based upon the received property identification information, and the processor 203 may consolidate the school district information with the other property-related information retrieved by the retriever 202 to generate the consolidated processed image. As another example, the retriever 202 may retrieve historical utility rate data for the property from a property source based upon the received property identification information, and the processor 203 may consolidate the historical utility rate data with the other property-related information retrieved by the retriever 202 to generate the consolidated processed image.

The retriever 202 may retrieve previous insurance claims data for the property from a property source based upon the received property identification information, and the processor 203 may consolidate the previous insurance claims data with the other property-related information retrieved by the retriever 202 to generate the consolidated processed image. As another example, the retriever 202 may retrieve county assessor data for the property from a property source based upon the received property identification information, and the processor 203 may consolidate the county assessor data with the other property-related information retrieved by the retriever 202 to generate the consolidated processed image.

The retriever 202 may retrieve surrounding area data for the property from a property source based upon the received property identification information, and the processor 203 may consolidate the surrounding area data with the other property-related information retrieved by the retriever 202 to generate the consolidated processed image. For example, the surrounding area data may include at least one of stores in the surrounding area, travel time to the user's workplace, attractions in the surrounding area, and the like.

Exemplary Sequence Diagram Between Computing Devices

Figure 3:
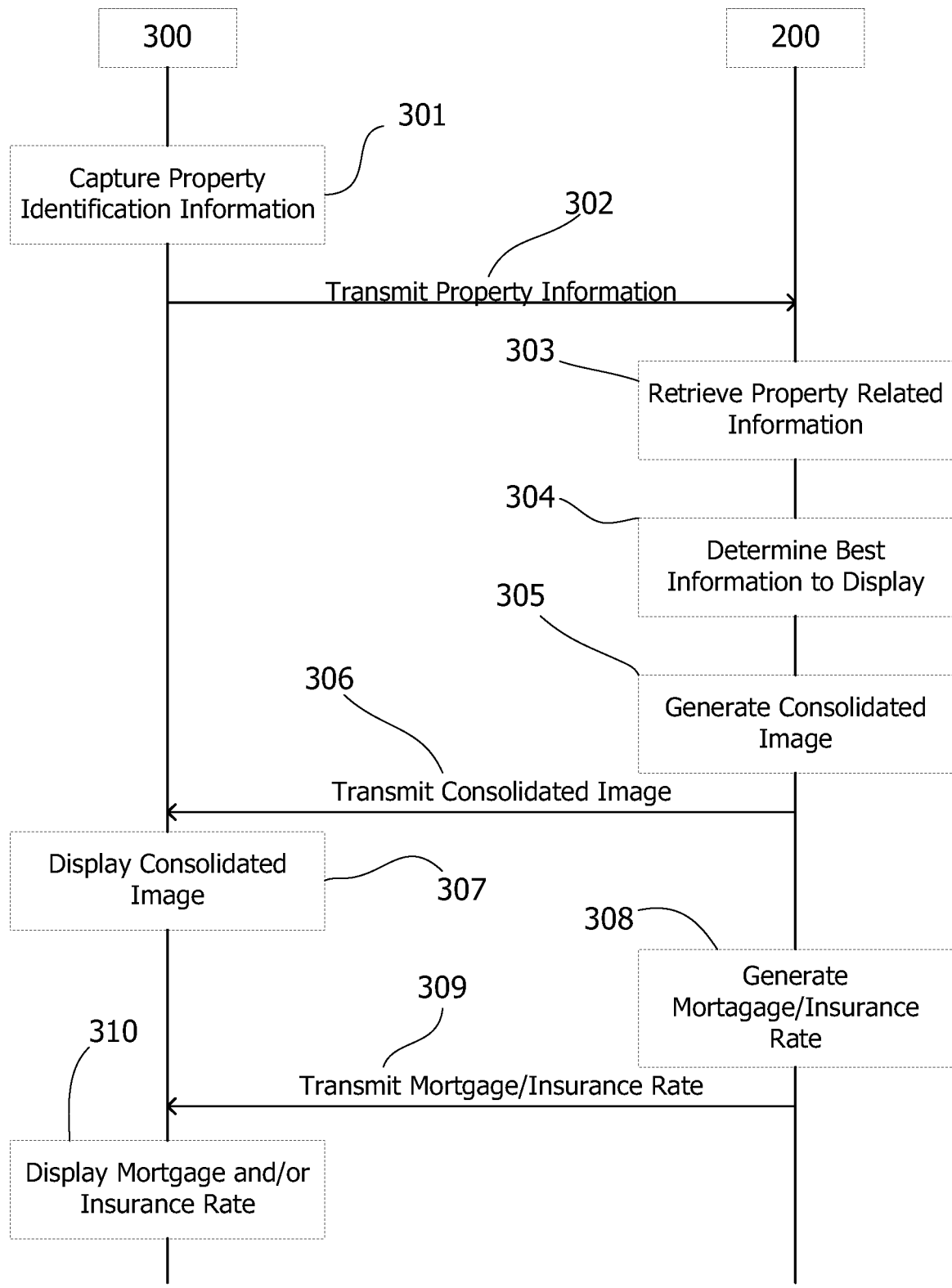
FIG. 3 illustrates an exemplary sequence diagram of a user capturing identification information of a property using a mobile device and transmitting the captured identification information to a property analyzer computing device, according to one exemplary embodiment.

FIG. 3 depicts an example of a sequence diagram of a user capturing identification information of a property using a mobile device and transmitting the captured identification information to a property-related information consolidating computing device, according to one exemplary embodiment.

Referring to FIG. 3, a mobile device 300 of a user communicates with a property-related information consolidating computing device ("computing device 200"). For example, the mobile device 300 may be a mobile phone, a tablet, a computer, a smart watch, a digital assistant, an MP3 player, and the like. The computing device 200 may be, for example, a computer, a server, a tablet, and the like. The communication may be wirelessly transmitted, transmitted via a wire, or a combination thereof. According to various embodiments, the mobile device 300 may store a mobile application which communicates with the computing device 200.

In 301, a user of a mobile device 300 may capture property identification information. For example, the mobile device 300 may include a camera which a user may use in 301 to capture one or more images of a property, and transmit in 302 the one or more images to the computing device 200, such as via wireless communication and/or data transmission. As another example, in 301, the mobile device 300 may capture location information of the property, and transmit the location information in 302, for example, Global Positioning System (GPS) coordinates, and the like. The location information may be automatically retrieved by the mobile device 300 and the mobile application stored thereon. As another example, a user may manually send the location information to the computing device 200.

According to one or more exemplary embodiments, the mobile device 300 may include a mobile application that is being processed by a processor of the mobile device 300. In this case, the mobile application may automatically or in response to a user input transmit the captured images and/or the location information to the computer device 200. In the exemplary embodiments herein, the at least one of the captured image and the location information are referred to as a property identifier, because the computing device 200 may use this information to identify the specific property that the user is attempting to gather information about.

Based upon the property identifier, the computing device retrieves property-related information in 303. For example, the property-related information may include historical information about the property, risk information about the property, object recognition information from a picture of the property, and the like. For example, the historical information and the risk information may be retrieved from one or more property sources, such as a public record database that is open to the public or an internal database of a company, such as a company that is controlling the computer system, for example, an insurance company, a realtor, and the like.

In an example in which the user transmits an image of the property in 302, a user does not need to enter specific address details about the property, but instead, may capture just an image and transmit the image to the computing device which leads to hands-free data gathering of the property using the mobile device 300 in communication with the computing device 200. As another example, the transmitted property identifier may be GPS coordinates of the property that are automatically gathered by the mobile application from the mobile device. Accordingly, the system may facilitate the gathering of information about the property without a user of the mobile device 300 having to enter information about the property other than merely capturing an image or GPS information being gathered by the mobile device 300. Accordingly, user convenience may be further enhanced by providing instant access to property-related information on a screen that would normally require the user to perform a separate manual look-up.

Because the data may be numerous, and the screen of a mobile device 300 may be limited in size, in 304 the computing device 200 may determine some property-related information from among the entire amount of the total retrieved property-related information that is best to be displayed to a user of the mobile device 300. For example, the computing device 200 may determine the best information to be displayed based upon predefined rules set by the user, areas of concern detected by the computing device 200, filters, and the like. The best information to be displayed may be consolidated into an image by the computing device 200 in 305 and transmitted to the mobile device 300 in 306. In response, the mobile device 300 may display the consolidated image in 307 on a screen thereof.

Furthermore, based upon at least one of the captured image, captured location, risk information, historical information, and object recognition information, at least one of mortgage rates and homeowner's insurance rates may be generated in 308 and may be transmitted to the mobile device 300, in 309. In this example, the transmission of the consolidated image and the mortgage/insurance rate is shown as separate transmissions, but in some examples both the consolidated image and the mortgage and/or insurance rates may be simultaneously transmitted. Regardless of whether the transmissions are separate or simultaneous, the mobile device 300 may display the consolidated image including the mortgage/insurance rate in 310.

Figure 4:
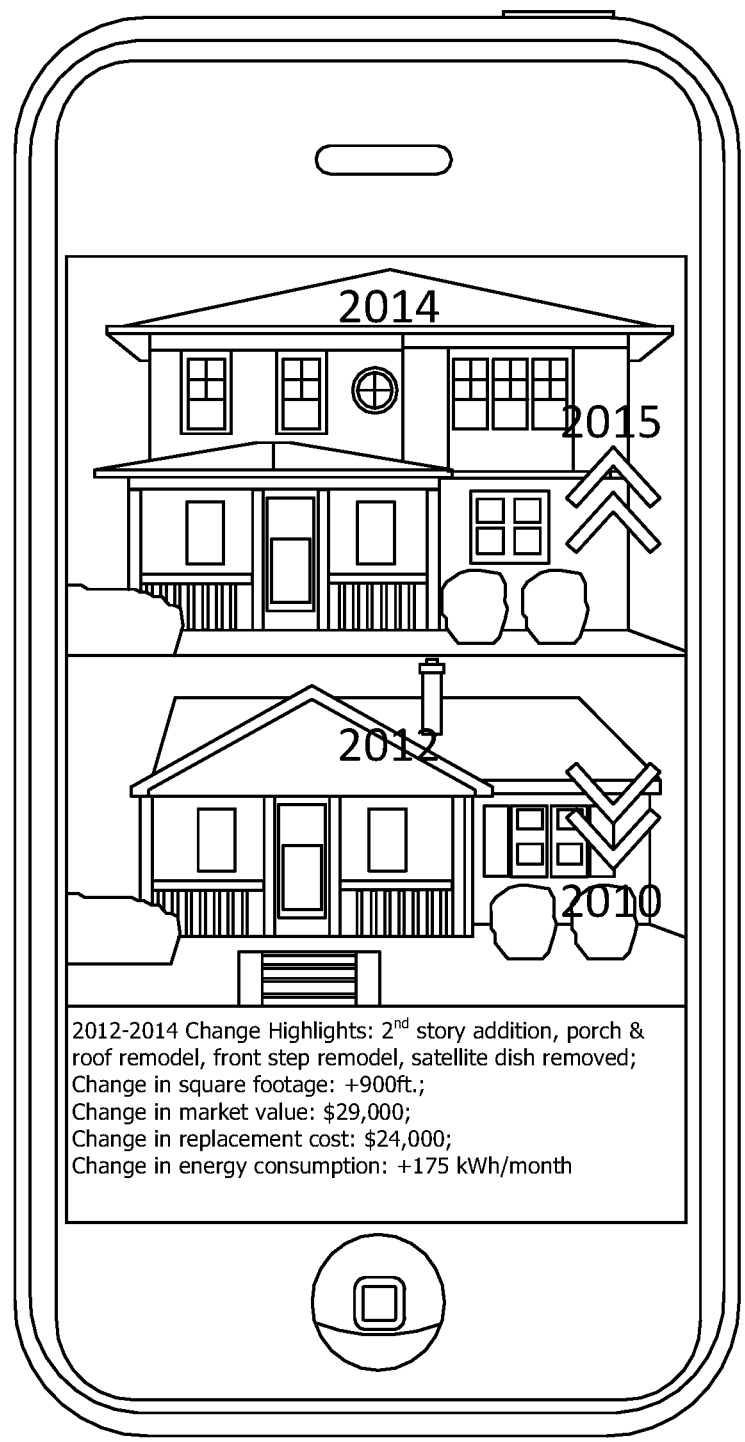
FIG. 4 illustrates an exemplary screen shot of a personal property including renovation information being simultaneously displayed with multiple pictures of the property in a consolidated view, according to one exemplary embodiment.
Figure 5:
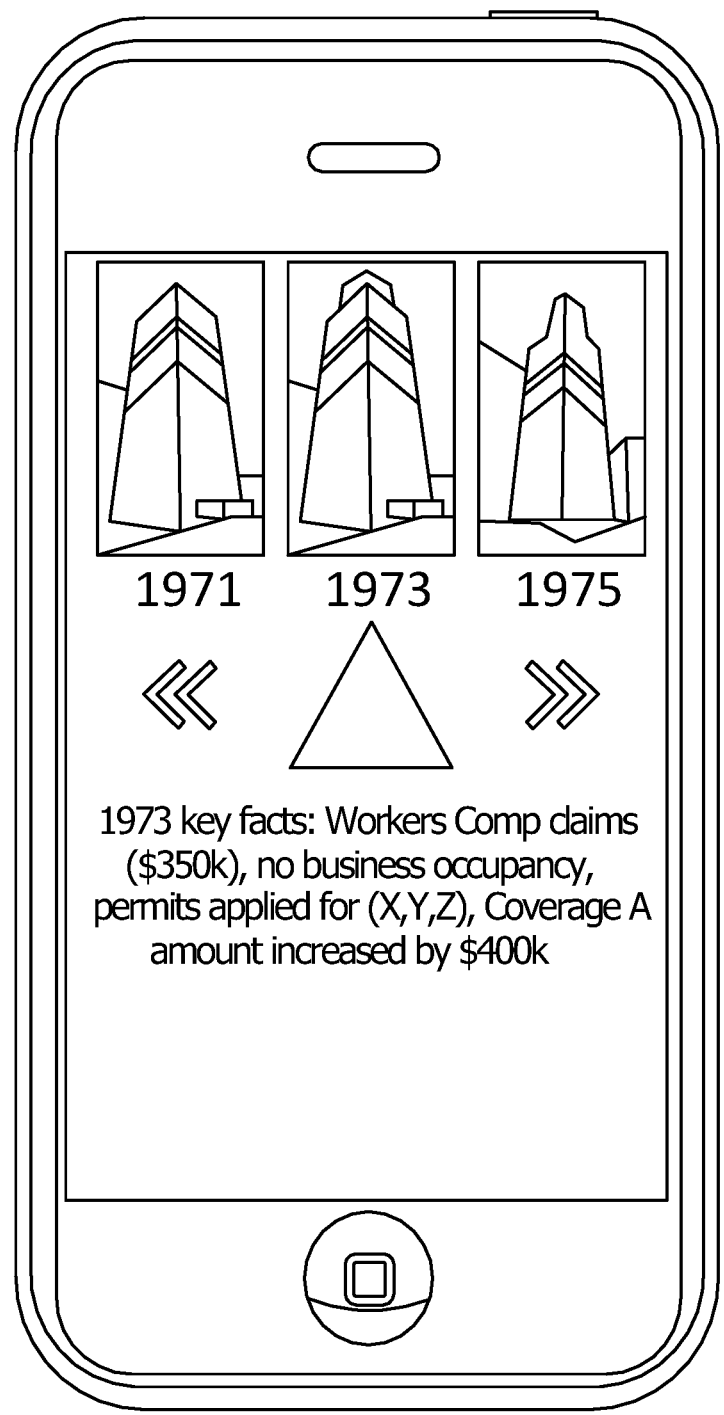
FIG. 5 illustrates an exemplary screen shot of a commercial property including insurance information, workers compensation information, and building permit data, being simultaneously displayed with a picture of the property in a consolidated view, according to one exemplary embodiment.
Figure 6:
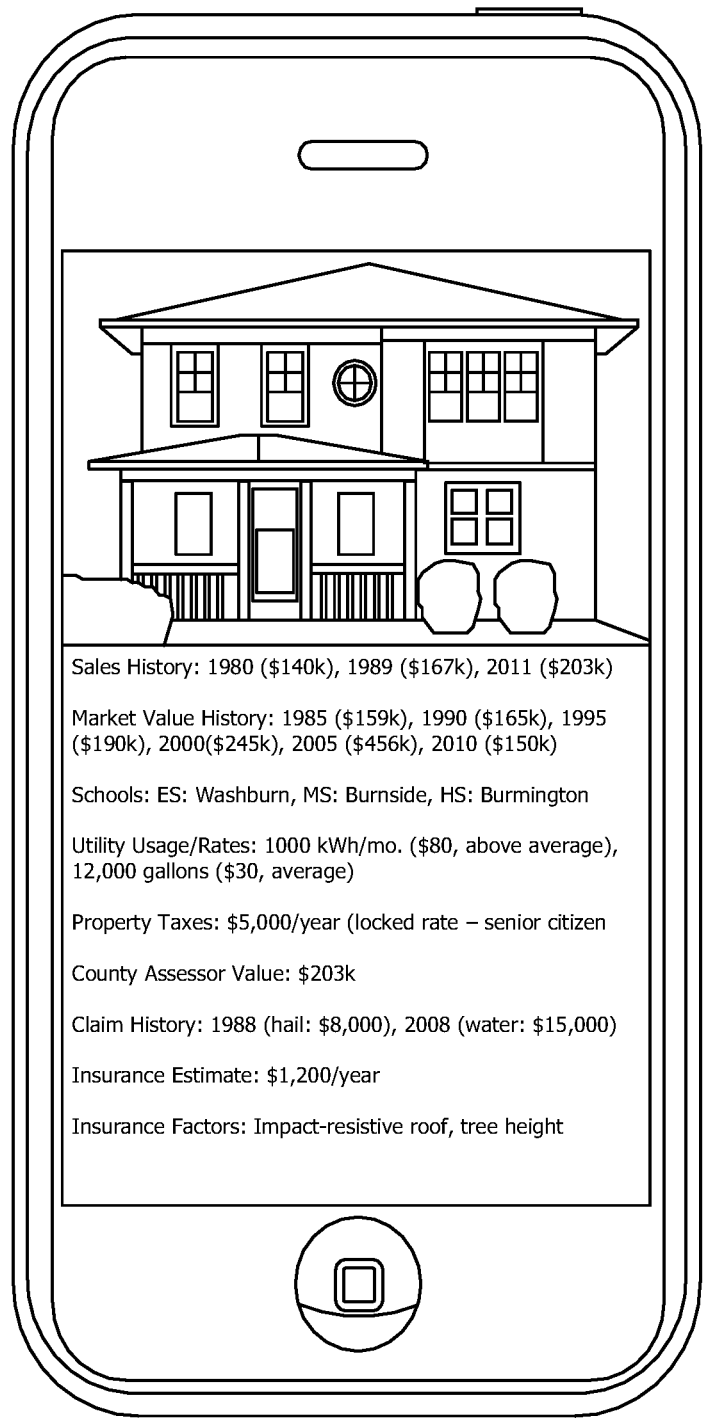
FIG. 6 illustrates another exemplary screen shot of a personal property including sales history information, market value information, school information, tax information, insurance information, and the like, being simultaneously displayed with a picture of the property in a consolidated view, according to one exemplary embodiment.

Exemplary Screen Shots of Various Properties Along with Consolidated Property-Related Information FIGS. 4-6 depict various screen shots of property-related information displayed in a consolidated view. For example, FIG. 4 depicts an example of a screen shot of a personal property including renovation information being simultaneously displayed with two pictures of the property in a consolidated view, according to one exemplary embodiment. The top picture highlights a new roof that was added in 2014 and an addition that was added in 2015, while the bottom picture illustrates what the property looked like in 2012 and 2010. In addition to the pictures, also illustrated is changes in market value and square footage of the property.

FIG. 5 depicts an example of a screen shot of a commercial property including insurance information, workers compensation information, and building permit data, being simultaneously displayed with three pictures of the property in a consolidated view, according to one exemplary embodiment. In this example, pictures of the property from 1971, 1973, and 1975 are illustrated. Also illustrated is workers compensation claims, building permits, and insurance coverage information from 1973.

FIG. 6 depicts another example of a screen shot of a personal property including sales history information, market value information, school information, tax information, insurance estimate information, county assessor value, and the like, being simultaneously displayed with a picture of the property in a consolidated view, according to one exemplary embodiment. As an example, an insurance estimate may be based upon the following formula: (Avg. Neighborhood Insurance Rate/Avg. Neighborhood Assessed Value)*(Assessed Value of Particular Property). Also included in the photo of FIG. 6 is a utility rate, insurance factors, school location information, and the like.

Figure 7:
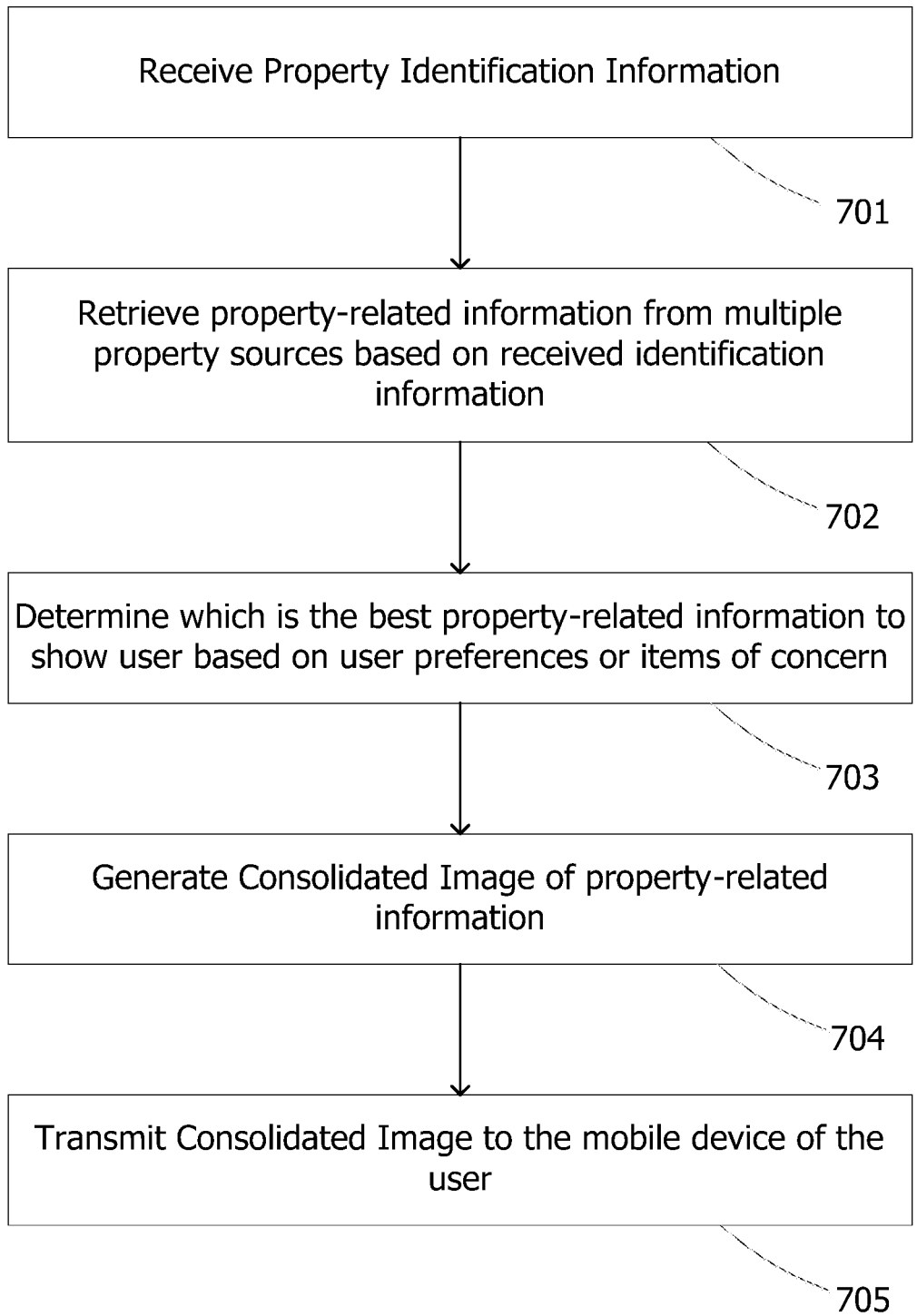
FIG. 7 illustrates an exemplary method for providing a user with a consolidated view of property-related information, according to one exemplary embodiment.

Exemplary Method for Providing a Consolidated View of Property-Related Information FIG. 7 depicts an example of a computer-implemented method for providing a user with a consolidated view of property-related information, according to one exemplary embodiment. This example includes a computer-based property analyzer method for displaying a combination of property-related information on a screen of a mobile device.

Referring to FIG. 7, in 701 the method may include receiving property identification information from a mobile device of a user. For example, the received property identification information may include a property identifier including at least one of a picture of the property or location information of the property. In 702, the method may further include retrieving property-related information from multiple property sources based upon the received property identification information. For example, each of the property sources may include a public record database or an internal database of a company, such as an insurance company, a mortgage company, a realtor, and the like.

In 703, the method may include determining which retrieved property-related information is the best to show to the user of the mobile device, for example, based upon user preferences, or areas of concern detected by the computing device. In 704, the method may further include consolidating the best determined property-related information retrieved during the retrieving, and generating a consolidated processed image of the property including the consolidated property-related information. In 705, the method may further include transmitting the consolidated processed image to the mobile device of the user.

Exemplary Functionality and Data Sources

The present embodiments may provide a computing device-based application that combines relevant home buying data sources into a single view for a user, enabling advanced and timely research capabilities. For instance, based upon location services (e.g., GPS), object recognition (e.g., matching photo of house to a library of property photos), or optical character recognition (e.g., identifying house numbers or street signs), the risk location address may be established. The property or home address may be the key to retrieving home buying-relevant information from 3rd parties and internal company data stores, and/or other sources mentioned herein, such as various websites.

In addition, images captured through the camera of the mobile device may be analyzed to determine disparities with $3^{rd}$ party or internal company data (e.g., when remodeling or weather damage has occurred), as well as recognition of specific safety, liability, or maintenance concerns (e.g., a damaged or aged roof). Trends related to the house and neighborhood may also be established and displayed (for example, trends in the price of the particular property over past 20 years or trends in taxes). A determination of the best information to display to a user may be generated based upon a combination of business rules (e.g., when a major concern is identified), user presets and preferences.

Further, users may act on their interest in the property in a number of ways via the capability to receive an insurance quote (based upon the information captured, retrieved and other customer information), receive mortgage rates (based upon the same), discover flood insurance eligibility, and/or browse historical images of a property (such images may be keyed to relevant information, based upon the year of the photo and the year of property-relevant facts). Customized rates for insurance and mortgage may be based upon "wallet data" captured in the set-up process of the application, in order to customize responses to user actions (and, for example, order consumer reports, in order to establish credit- and loss-based rating and eligibility facts).

In addition to the object recognition inputs, the application may retrieve and aggregate data from one or more of the following sources: internal company data for the property, historical severe weather data for the immediate vicinity, crime records for the area, legislative activities that bear on the property (e.g., local property tax rates), local municipal alerts (historical), tax credit records (e.g., for upgrades to the property's appliances), building permit data, county assessor valuations, claims/loss data, flood plain maps, peril maps (e.g., wildfire or storm surge risks), historical "street view" images (keyed by address and timestamp metadata), historical utilities rate data (trends and current going rates for electricity, etc.), market value fluctuations (per sale and/or per estimated value ranges via services such as Zillow), school district information (including which schools serve the neighborhood and their various rankings and performance data), upkeep trends (based upon evidence in historical images), and information about the surrounding area (e.g., grocery stores within walking distance, travel times to a user's workplace, etc.). Various "augmented reality" enhancements may also be envisioned (e.g., overlaying any or all of the above information onto video feed on a mobile device that has a camera and a screen).

Further enhancements may include using this application to stream information to a remote customer service associate (e.g., in an insurance sales situation) in order to allow for visual images (and all of the various sources of information noted above) to be put into the hands of an expert for further analysis. Additional enhancements may also include the above application being embedded within a larger suite of applications that facilitate the entire home purchasing experience (including facilitation of the sales negotiation, inspections, and closing).

Integration of data sources may include, and/or be associated with, (i) picture-based risk location and property identification (for no-typing approach); (ii) active object recognition for risk determination (not just report consolidation); (iii) historical image browsing (based upon location identification); (iv) historical maintenance browsing; (v) pre-fill of insurance quote; and/or (vi) pre-fill of mortgage quote.

In one aspect, a computer-implemented method for providing property-related information to online customers may be provided. The method may include (1) receiving, via one or more processors (and/or transceivers), a property image and/or a property location associated with the property from a mobile device of a customer, such as via wireless communication or data transmission; (2) using, via the one or more processors, the property image or property location to retrieve property-related information associated with the property (which may include historical images of the property) from one or more databases or communication networks (such as the internet); (3) generating, via the one or more processors, a composite display of the property using (i) the property-related information associated with the property retrieved, and/or (ii) the property image received from the mobile device, the composite display including one or more images of the property and information related to one or more topics associated with the property (such as community information, tax or tax assessment information, crime rates, school information, utility information, insurance pricing or quotes (and/or premiums or discounts), past insurance claim history, past home repair or remodeling information, square footage within the home, home features, home loan information, and other information); and/or (4) transmitting, via the one or more processors (and/or associated transceivers), the composite display to the mobile device of the customer, such as via wireless communication or data transmission, to provide the property-related information on the mobile device display for the customer's review or approval, and to enhance an online customer experience. The method may include additional, less, or alternate actions, including those discussed elsewhere herein, and may be implemented via one or more local or remote processors and/or via computer-executable instructions stored on non-transitory computer-readable instructions.

In another aspect, a computer system for providing property-related information to customers may be provided. The computer system may include one or more processors and/or transceivers configured to: (1) receive a property image and/or a property location associated with the property from a mobile device of a customer, such as via wireless communication or data transmission; (2) using or analyzing the property image or property location to retrieve property-related information associated with the property (which may include historical images of the property) from one or more databases or communication networks (such as the internet); (3) generate a composite display of the property using (i) the property-related information associated with the property retrieved, and/or (ii) the property image received from the mobile device, the composite display including one or more images of the property and information related to one or more topics associated with the property (such as community information, tax or tax assessment information, crime rates, school information, utility information, insurance pricing or quotes (and/or premiums or discounts), past insurance claim history, past home repair or remodeling information, home loan information, and other information); and/or (4) transmit the composite display to the mobile device of the customer, such as via wireless communication or data transmission, to provide the property-related information on the mobile device display for the customer's review or approval, and/or to enhance an online customer experience. The system may include additional, less, or alternate functionality, including that discussed elsewhere herein.

Exemplary Mobile Device

Figure 8:
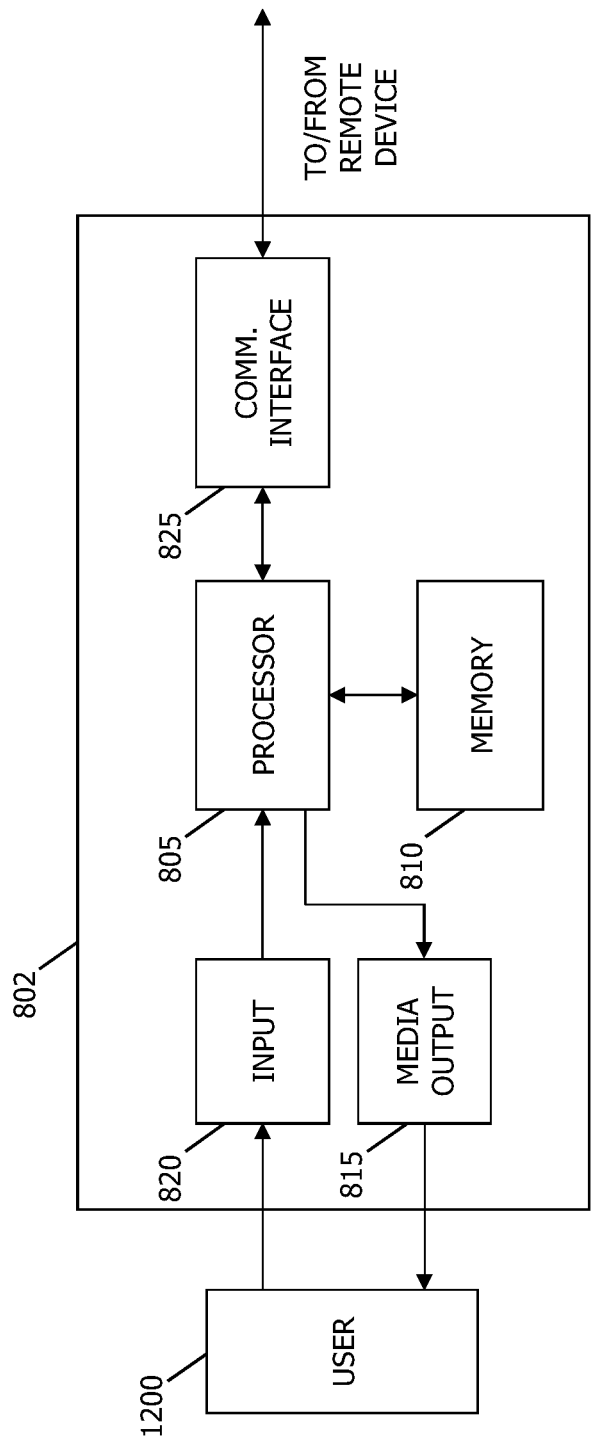
FIG. 8 illustrates an exemplary mobile computing device according to one exemplary embodiment.

FIG. 8 depicts an exemplary configuration of a mobile computing device, i.e., a mobile device, 802 which may be the equivalent of mobile device 300 shown in FIG. 3. Mobile computing device 802 may include a processor 805 for executing instructions. In some embodiments, executable instructions may be stored in a memory area 810. Processor 805 may include one or more processing units (e.g., in a multi-core configuration). Memory area 810 may be any device allowing information such as executable instructions and/or other data to be stored and retrieved. Memory area 810 may include one or more computer-readable media. Memory area 810 may further store a mobile application, for example, a property-related mobile application that may be executed by the processor 805.

Mobile computing device 802 may also include at least one media output component 815 for presenting information to a user 1200. Media output component 815 may be any component capable of conveying information to user 1200. In some embodiments, media output component 815 may include an output adapter, such as a video adapter and/or an audio adapter. An output adapter may be operatively coupled to processor 805 and capable of being coupled to an output device, such as a display device (e.g., a liquid crystal display (LCD), organic light emitting diode (OLED) display, cathode ray tube (CRT), or "electronic ink" display) or an audio output device (e.g., a speaker or headphones). In some embodiments, media output component 815 may be configured to present an interactive user interface (e.g., a web browser or client application) to user 1200. The interactive user interface may include, for example, a reality augmentation interface for requesting and viewing Enhanced Situation Visualization.

In some embodiments, mobile computing device 802 may include an input device 820 for receiving input from user 1200. Input device 820 may include, for example, a keyboard, a pointing device, a mouse, a stylus, a touch sensitive panel (e.g., a touch pad or a touch screen), a camera, a gyroscope, an accelerometer, a position detector, and/or an audio input device. A single component such as a touch screen may function as both an output device of media output component 815 and input device 820.

Computing device 802 may also include a communication interface 825, which is communicatively coupled to a remote device such as insurance computing device. Communication interface 825 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 810 may be, for example, computer-readable instructions for providing a user interface to user 1200 via media output component 815 and, optionally, receiving and processing input from input device 820. A user interface may include, among other possibilities, a web browser and client application. Web browsers enable users 1200 to display and interact with media and other information typically embedded on a web page or a website from a web server associated with a merchant. A client application allows users 1200 to interact with a server application associated with, for example, a vendor or business.

Exemplary Server Device

Figure 9:
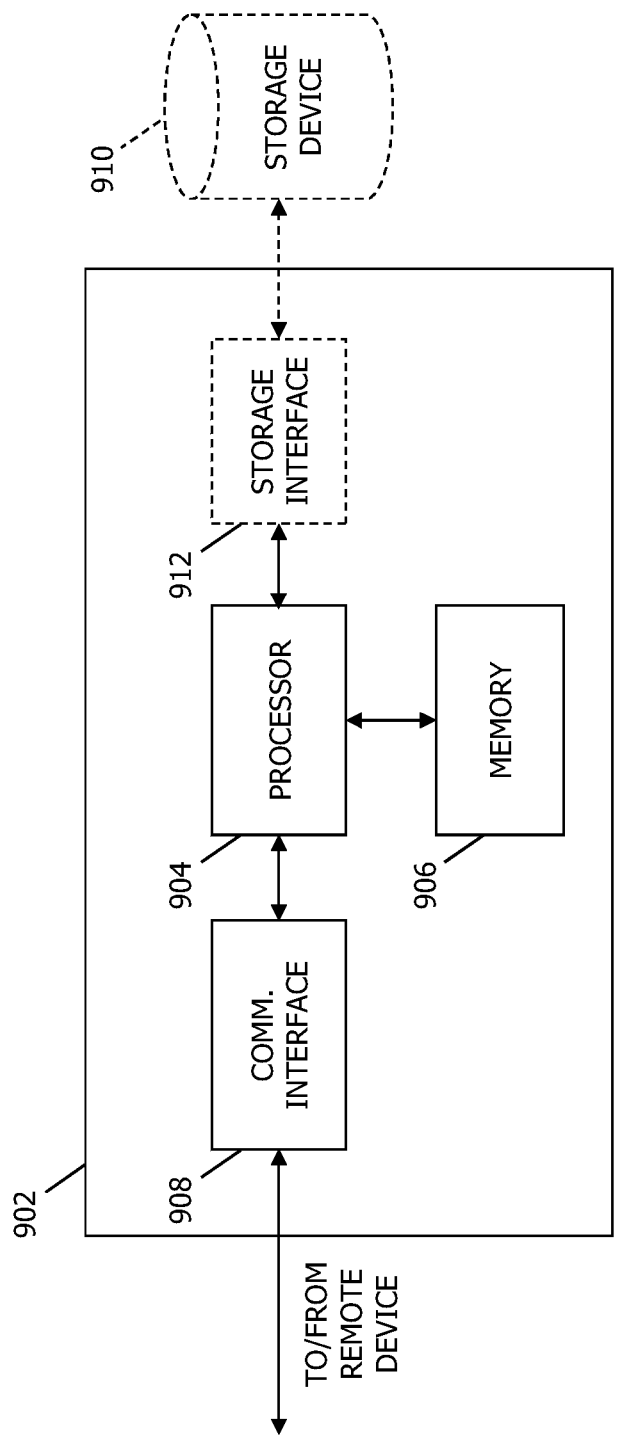
FIG. 9 illustrates another exemplary property analyzer computing device according to another exemplary embodiment.

FIG. 9 depicts an exemplary configuration of a server computing device 902 which may be the computing device 200 shown in FIG. 3. Server computing device 902 may be representative of user computing device, an insurance computing device, a utility computing device, a mortgage rate computing device, and the like. Server computing device 902 may include a processor 904 for executing instructions. Instructions may be stored in a memory area 906, for example. Processor 904 may include one or more processing units (e.g., in a multi-core configuration).

Processor 904 may be operatively coupled to a communication interface 908 such that server computing device 902 may be capable of communicating with a remote device, such as mobile computing device 802 shown in FIG. 8 or another server computing device 902. For example, communication interface 908 may receive requests from a user of mobile computing device 802 via the Internet.

Processor 904 may also be operatively coupled to a storage device 910. Storage device 910 may be any computer-operated hardware suitable for storing and/or retrieving data. In some embodiments, storage device 910 may be integrated in server computing device 902. For example, server computing device 902 may include one or more hard disk drives as storage device 910. In other embodiments, storage device 910 may be external to server computing device 902 and may be accessed by a plurality of server computing devices 902. For example, storage device 910 may include multiple storage units such as hard disks or solid state disks in a redundant array of inexpensive disks (RAID) configuration. Storage device 910 may include a storage area network (SAN) and/or a network attached storage (NAS) system.

In some embodiments, processor 904 may be operatively coupled to storage device 910 via a storage interface 912. Storage interface 912 may be any component capable of providing processor 904 with access to storage device 910. Storage interface 912 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 904 with access to storage device 910.

Memory areas 810 (shown in FIGS. 8) and 906 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of a computer program.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In one example embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computing device for causing display of a combination of property-related information, the computing device comprising at least one processor in communication with at least one memory, wherein the at least one processor is programmed to:
   receive video feed data associated with a video feed of a property, the video feed including at least one object;
   generate an augmented reality overlay for electronic display on a display device, wherein the augmented reality overlay is configured to display at least a portion of property-related information identified as being associated with the at least one object in the video feed of the property; and
   transmit a plurality of computer executable instructions to the display device that cause the display device to:
      display the video feed; and
      display the augmented reality overlay simultaneously with the video feed.

2. The computing device of claim 1, wherein the at least one processor is further programmed to generate the plurality of computer executable instructions according to preset rules that are based upon at least one of user preferences, user settings, or identified concerns about the property.

3. The computing device of claim 1, wherein the at least one processor is further programmed to identify the property based upon an image captured of the property.

4. The computing device of claim 3, wherein the image of the property is captured from the video feed of the property.

5. The computing device of claim 1, wherein the at least one processor is further programmed to identify the property based upon a location of the computing device.

6. The computing device of claim 5, wherein the location of the computing device is determined from Global Positioning System (GPS) coordinates.

7. The computing device of claim 1, wherein the display device is separate from the computing device.

8. The computing device of claim 1, wherein the display device is an augmented reality device.

9. The computing device of claim 1, wherein the display device is a virtual reality device.

10. The computing device of claim 1, wherein the at least one processor is further programmed to:
    generate an insurance quote for the property; and
    cause the augmented reality overlay to include the insurance quote such that the insurance quote is displayed on the display device.

11. The computing device of claim 1, wherein the at least one processor is further programmed to:
    generate a mortgage rate quote for the property; and
    cause the augmented reality overlay to include the mortgage rate quote such that the mortgage rate quote is displayed on the display device.

12. The computing device of claim 1, wherein the at least one processor is further programmed to:
    retrieve historical severe weather data for the property; and
    cause the augmented reality overlay to include the historical severe weather data such that the historical severe weather data is displayed on the display device.

13. The computing device of claim 1, wherein the at least one processor is further programmed to:
    retrieve risk information for the property; and
    cause the augmented reality overlay to include the risk information for the property such that the risk information is displayed on the display device.

14. The computing device of claim 13, wherein the risk information comprises information about at least one of flooding, wildfire, or storm surge, with respect to the property.

15. The computing device of claim 1, wherein the at least one processor is further programmed to:
retrieve at least one of criminal record data for the property, property tax data for the property, market value cost data for the property, building permit data, or county assessor data for the property; and
cause the augmented reality overlay to display at least one of the criminal record data, the property tax data, the market value cost data, the building permit data, or the county assessor data on the display device.

16. The computing device of claim 1, wherein the at least one processor is further programmed to:
retrieve school district information for the property; and
cause the augmented reality overlay to include the school district information such that the school district information is displayed on the display device.

17. The computing device of claim 1, wherein the at least one processor is further programmed to:
retrieve historical utility rate data for the property; and
cause the augmented reality overlay to include the historical utility rate data such that the historical utility rate data is displayed on the display device.

18. The computing device of claim 1, wherein the at least one processor is further programmed to:
retrieve previous insurance claims data for the property; and
cause the augmented reality overlay to include the previous insurance claims data such that the previous insurance claims data is displayed on the display device.

19. The computing device of claim 1, wherein the at least one processor is further programmed to:
retrieve surrounding area data for a surrounding area of the property, wherein the surrounding area data comprises at least one of stores in the surrounding area, travel time to a workplace of a user, or attractions in the surrounding area; and
cause the augmented reality overlay to include the surrounding area data such that the surrounding area data is displayed on the display device.

20. The computing device of claim 1, wherein the at least one processor is further programmed to retrieve property-related information from at least one of a public records database or an internal database based upon the property.

21. The computing device of claim 1, wherein the at least one processor is further programmed to visually highlight changes that have been made to the property over time.

22. The computing device of claim 1, wherein the at least one processor is further programmed to:
combine the augmented reality overlay and the video feed to generate a consolidated property-related image; and
transmit the consolidated property-related image to a customer service associate of an insurance company.

23. A computer-based property analyzer method for displaying a combination of property-related information, the method comprising:
receiving video feed data associated with a video feed of a property, the video feed including at least one object;
generating an augmented reality overlay for electronic display on a display device, wherein the augmented reality overlay is configured to display at least a portion of property-related information identified as being associated with the at least one object in the video feed of the property; and
transmitting a plurality of computer executable instructions to the display device that cause the display device to:
display the video feed; and
display the augmented reality overlay simultaneously with the video feed.

24. A mobile device for displaying a combination of property-related information, the mobile device comprising at least one processor in communication with at least one memory and further in communication with a display device, wherein the at least one processor is programmed to:
receive video feed data associated with a video feed of a property, the video feed including at least one object;
generate an augmented reality overlay for electronic display on the display device, wherein the augmented reality overlay is configured to display at least a portion of property-related information identified as being associated with the at least one object in the video feed of the property; and
instruct the display device to:
display the video feed; and
display the augmented reality overlay simultaneously with the video feed.

* * * * *